(12) United States Patent
Yamamoto et al.

(10) Patent No.: US 6,789,135 B1
(45) Date of Patent: Sep. 7, 2004

(54) APPARATUS FUNCTION CHANGE SYSTEM HAVING AN APPARATUS SERVICE CENTER CONTAINING CUSTOMER INFORMATION AND SETTING INFORMATION FOR A RECONFIGURABLE CHIP

(75) Inventors: Shinichi Yamamoto, Hirakatashi (JP); Tamotsu Nishiyama, Yokohamashi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/393,108

(22) Filed: Sep. 9, 1999

(30) Foreign Application Priority Data

Sep. 9, 1998 (JP) ............................................ 10-255009
May 24, 1999 (JP) ............................................ 11-144108

(51) Int. Cl.⁷ ............................ G06F 13/14; G06F 9/06
(52) U.S. Cl. ............................ 710/8; 709/203; 713/100
(58) Field of Search ...................... 710/8, 10; 713/100; 709/201, 203; 717/168–178

(56) References Cited

U.S. PATENT DOCUMENTS

| | | | |
|---|---|---|---|
| 5,012,234 A | * | 4/1991 | Dulaney et al. ............ 340/7.39 |
| 5,195,130 A | * | 3/1993 | Weiss et al. ............... 379/93.19 |
| 5,321,840 A | * | 6/1994 | Ahlin et al. ................. 710/10 |
| 5,572,572 A | * | 11/1996 | Kawan et al. .............. 375/222 |
| 5,999,990 A | * | 12/1999 | Sharrit et al. ............... 709/103 |
| 6,240,172 B1 | * | 5/2001 | Zhu ....................... 379/110.01 |

FOREIGN PATENT DOCUMENTS

| | | | |
|---|---|---|---|
| JP | 10-78932 | * | 3/1998 |
| JP | 11015866 | | 1/1999 |
| JP | 10078932 | | 3/1999 |

* cited by examiner

*Primary Examiner*—Ilwoo Park
(74) *Attorney, Agent, or Firm*—Snell & Wilmer, LLP

(57) ABSTRACT

An apparatus function change service system for changing a function of an apparatus including a reconfigurable chip includes a request receiving section for receiving a request for a function change of the apparatus from a user of the apparatus; a specifying section for specifying a change to be made in the reconfigurable chip for fulfilling the request based on the request; and a changing section for performing the change in the reconfigurable chip based on the specified change to be made in the reconfigurable chip.

12 Claims, 5 Drawing Sheets

APPARATUS FUNCTION CHANGE SYSTEM HAVING AN APPARATUS SERVICE CENTER CONTAINING CUSTOMER INFORMATION AND SETTING INFORMATION FOR A RECONFIGURABLE CHIP

BACKGROUND OF THE INVENTION

1. Field of the Invention

The present invention relates to an apparatus function change service system for changing a function of an apparatus including a reconfigurable chip which is preferable to perform function changes such as, for example, function addition and expansion, and repair of the apparatus after the apparatus is acquired by a user.

2. Description of the Related Art

Conventionally, functions of hardware of electronic apparatuses such as personal computers are fixed before the apparatuses are put on the market. Personal computers, which generally include a high performance CPU, allow various types of processing (e.g., wordprocessing, electronic mailing, internet search, and moving picture reproduction) to be performed by use of various types of application software. Today, network computers are also available as low priced personal computers without a hard disk.

When purchasing a personal computer, a user selects his or her favorite model among various models after considering his or her purpose of purchase.

A computer novice who purchases a personal computer merely to use a wordprocessing function does not need high performance hardware (e.g., high performance chip) built in the personal computer, at least at the time of purchase. A user who knows he or she will use only the wordprocessing function in the future will never need such high performance hardware. For such users, the personal computers mounting high performance hardware are inconveniently costly. Such an inconvenience is caused by the fact that functions of the hardware in each model of personal computers are fixed before the personal computers are put on the market.

A user who has purchased a network computer as a low priced personal computer can not use the computer for processing which requires a great amount of operations, due to the limited performance of the hardware. In such a case, the user is required to purchase another personal computer or hardware for expanding the functions.

These problems are caused because the business of selling computers promotes purchases of additional hardware or another computer in order to expand the functions, although the business operates on condition that after-purchase service is provided. This type of business shortens the life of apparatuses and thus does not consider today's critical waste disposal problems and other environmental issues.

SUMMARY OF THE INVENTION

An apparatus function change service system for changing a function of an apparatus including a reconfigurable chip includes a request receiving section for receiving a request for a f unction change of the apparatus; a specifying section for specifying a change to be made in the reconfigurable chip based on the request; and a changing section for performing the change in the reconfigurable chip based on the specified change to be made in the reconfigurable chip.

In one embodiment of the invention, the request is for repair of the apparatus.

In one embodiment of the invention, the request is for one of function addition of the apparatus and function expansion of the apparatus.

In one embodiment of the invention, the change in the reconfigurable chip is performed via a network.

In one embodiment of the invention, the reconfigurable chip includes a plurality of circuit blocks for realizing different functions from one another.

In one embodiment of the invention, the reconfigurable chip includes a reconfigurable circuit for realizing a prescribed function in accordance with circuit information.

In one embodiment of the invention, the reconfigurable chip further includes a plurality of circuits for realizing an identical function.

Thus, the invention described herein makes possible the advantage of providing an apparatus function change service system for realizing a function change in accordance with the user's demand at each point of time without requiring additional hardware.

This and other advantages of the present invention will become apparent to those skilled in the art upon reading and understanding the following detailed description with reference to the accompanying figures.

DESCRIPTION OF THE EMBODIMENTS

Hereinafter, the present invention will be described by way of illustrative examples with reference to the accompanying drawings.

Figure 1:
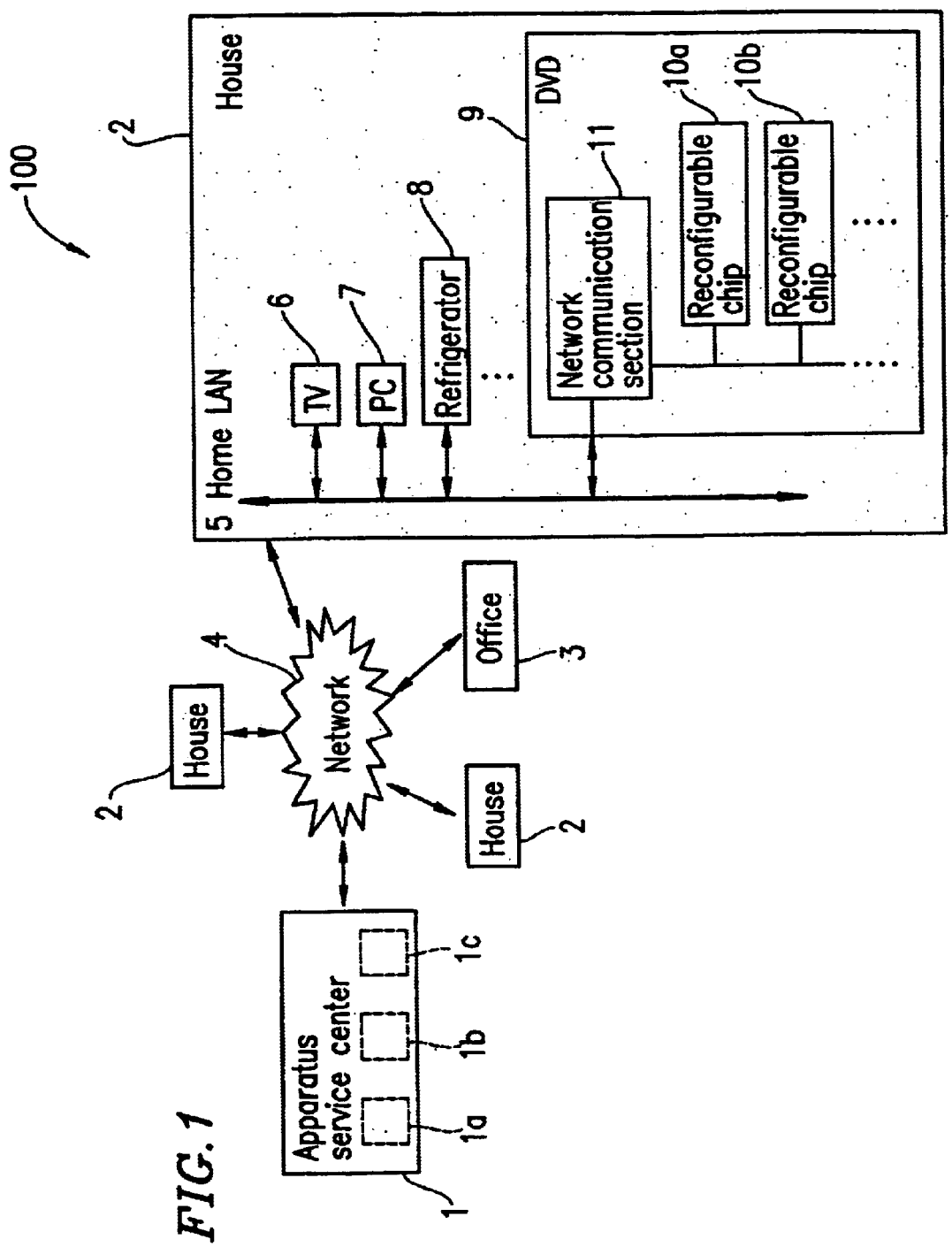
FIG. 1 is a diagram illustrating the entirety of an apparatus function change service system in one example according to the present invention.

FIG. 1 is a diagram illustrating the entirety of an apparatus function change service system 100 in one example according to the present invention.

As shown in FIG. 1, an apparatus service center 1 is connected to a house 2 and/or an office 3 through a network 4. The house 2 accommodates apparatuses (information household appliances such as, for example, a TV 6, a personal computer 7, a refrigerator 8, and a DVD (Digital Video Disc or Digital Versatile Disc) recording and reproduction apparatus 9 (hereinafter, referred to simply as "DVD 9". These apparatuses are connected in the house 2 through a home LAN 5.

The apparatus function change service system 100 operates, for example, in the following manner.

The apparatus service center 1 receives a request for a function change In an apparatus in the house 2. In accordance with the request, the apparatus service center 1 changes the function of the apparatus in the house 2 so as to fulfill the request. Such a function change is performed in a remote controlling manner from the apparatus service center 1 via the network 4.

The DVD 9 in the house 2 includes, for example, a network communication section 11 and reconfigurable chips 10a and 10b as shown in FIG. 1 as a chip structure of the DVD 9. The DVD 9 further includes components required for recording and reproduction (for example, a spindle motor for rotating a disk or a pickup for reproducing data recorded on the disk by irradiating the disk with light), but such components are omitted from FIG. 1. The reconfigurable chips 10a and 10b are each able to reconfigure themselves based on information which is output by the network communication section 11. The function change in the DVD 9 is achieved by reconfiguring the reconfigurable chip 10a or 10b based on information which is sent from the apparatus service center 1.

Other apparatuses accommodated in the house 2 each include at least one reconfigurable chip which operates in a similar manner.

The apparatus service center 1 can be installed on a distributor-by-distributor basis or industry-by-industry basis.

Figure 2:
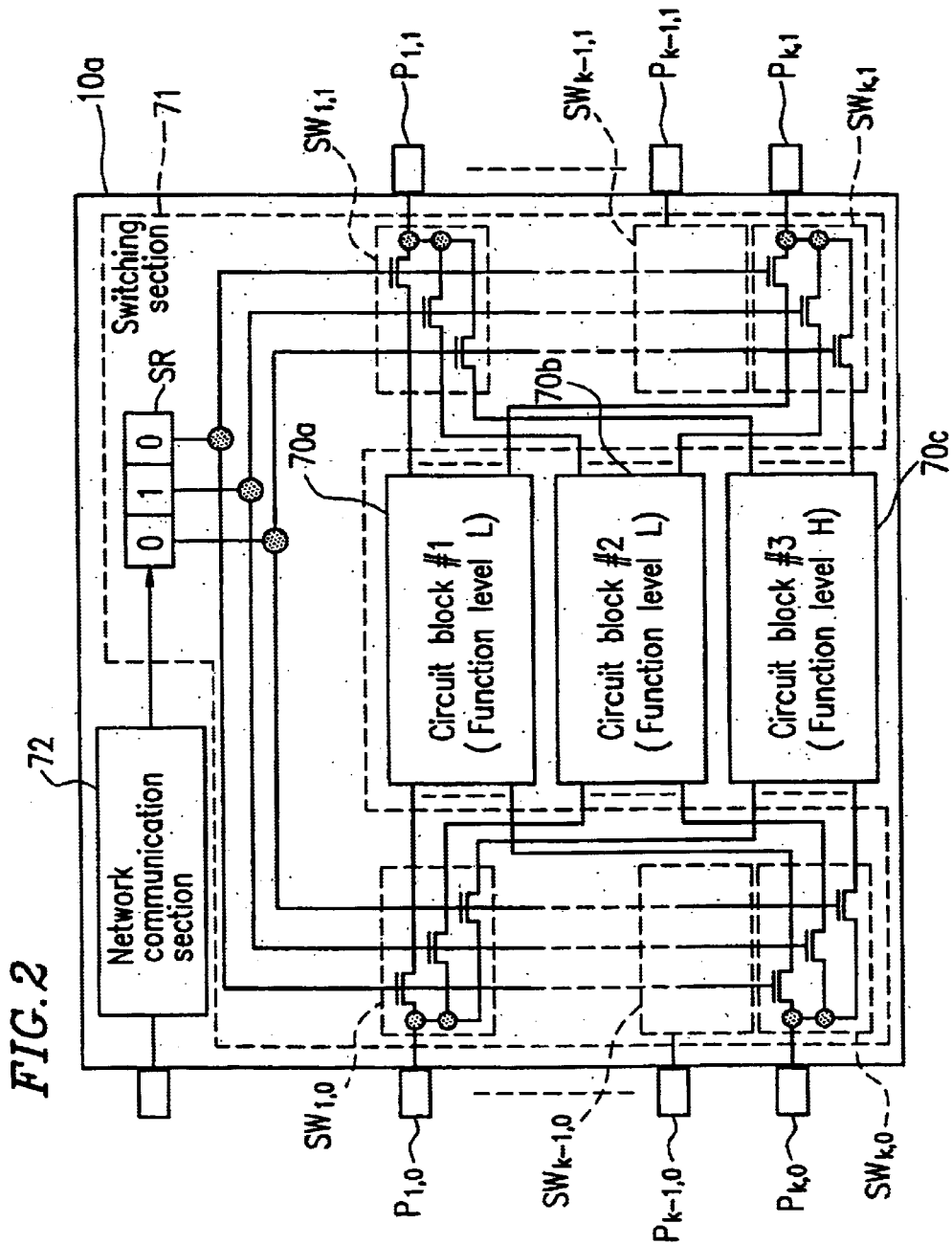
FIG. 2 is a block diagram illustrating an exemplary configuration of a reconfigurable chip mounted on the apparatus shown in FIG. 1.

FIG. 2 is a block diagram illustrating a configuration of the reconfigurable chip 10a included in the DVD 9 (FIG. 1).

The reconfigurable chip 10a includes a circuit block #1 (70a) having a function level L (low), a circuit block #2 (70b) having a function level L, and a circuit block #3 (70c) having a function level H (high). The circuit blocks 70a and 70b having the function level L perform, for example, at three times (3×) higher speed reproduction than the normal speed. The circuit block 70c having the function level H performs, for example, at ten times (10×) higher speed reproduction than the normal speed.

As can be appreciated from the above, a reconfigurable chip (e.g., reconfigurable chip 10a) includes a plurality of circuit blocks having the identical function level and another circuit block having a function level higher than that of the plurality of circuit blocks. At least one of the plurality of circuit blocks having the identical function level is replaceable with one another. Accordingly, at least one of the plurality of circuit blocks having the identical function level is usable as a spare circuit block. The circuit block having the higher function level is usable for upgrading.

As shown in FIG. 2, the reconfigurable chip 10a further includes a network communication section 72 for receiving information for reconfiguring the reconfigurable chip 10a from the apparatus service center 1 (FIG. 1), and a switching section 71 for switching the connection of the circuit blocks 70a through 70c with external pins $P_{1,0}$ through $P_{k,0}$ and $P_{1,1}$ through $P_{k,1}$.

The switching section 71 includes switches $SW_{1,0}$ through $SW_{k,0}$ for connecting one of the circuit blocks 70a through 70c to the external pins $P_{1,0}$ through $P_{k,0}$, switches $SW_{1,1}$ through $SW_{k,1}$ for connecting one of the circuit blocks 70a through 70c to the external pins $P_{1,1}$ through $P_{k,1}$, and a nonvolatile shift register SR. The switches $SW_{1,0}$ through $SW_{k,0}$ and $SW_{1,1}$ through $SW_{k,1}$ are controlled by information which is held in the shift register SR.

When, for example, the information held in the shift register SR is 3-bit data (0,1,0), the circuit block 70b is connected to the external pins $P_{1,0}$ through $P_{k,0}$ and $P_{1,1}$ through $P_{k,1}$. This indicates that the circuit block 70b is selectively used among the circuit blocks 70a through 70c. In a similar manner, when the information held in the shift register SR is 3-bit data (1,0,0), the circuit block 70c is connected to the external pins $P_{1,0}$ through $P_{k,0}$ and $P_{1,1}$ through $P_{k,1}$. Thus, the circuit block 70c is selectively used. When the information held in the shift register SR is 3-bit data (0,0,1), the circuit block 70a is connected to the external pins $P_{1,0}$ through $P_{k,0}$ and $P_{1,1}$ through $P_{k,1}$. Thus, the circuit block 70a is selectively used.

A change in the 3-bit data held in the shift register SR can be instructed by the apparatus service center 1 (FIG. 1) via the network 4, the home LAN 5 and the network communication section 11 (the network communication section 72). Thus, a function change in the reconfigurable chip 10a in the DVD 9 accommodated in the house 2 can be performed by the apparatus service center 1 in a remote controlling manner.

The reconfigurable chip 10a can include circuit blocks having three or more different function levels. For example, the reconfigurable chip 10a can include a circuit block having a function level L (low) for performing 5× reproduction, a circuit block having a function level M (middle) for performing 10× reproduction, and a circuit block having a function level H (high) for performing 20× reproduction.

All of the other reconfigurable chips included in the DVD 9 (for example, the reconfigurable chip 10b) have the configuration shown in FIG. 2.

The communication between the apparatus service center 1 and the house 2 is performed by, for example, transferring a packet. A packet includes a header section indicating the destination of the data which is transferred and a data section indicating the data to be transferred. The header section includes an apparatus recognition number given to each of the apparatuses In the house 2 and a chip recognition number given to each of the reconfigurable chips included in each apparatus. Such a configuration of the header section allows the packet to be transferred to a specific reconfiguration chip in a specific apparatus accommodated in the house 2 from the apparatus service center 1.

Each apparatus in the house 2 can have one network communication section as the network communication section 11 shown in FIG. 1, or each reconfigurable chip can have one communication section as the network communication section 72 shown in FIG. 2.

Figure 3:
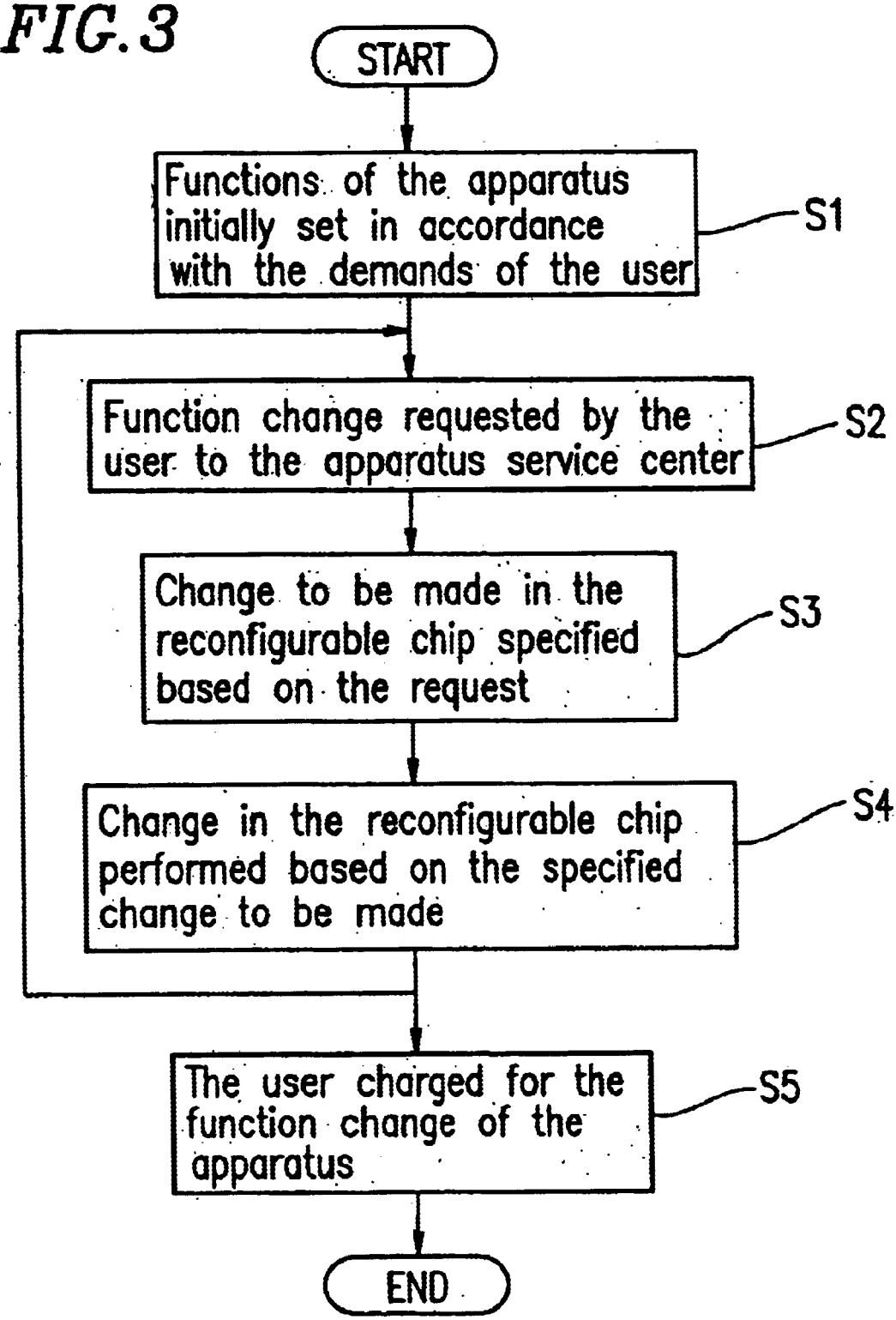
FIG. 3 is a flowchart Illustrating a method for performing a function change by an apparatus service center shown in FIG. 1.

With reference to FIG. 3, a method for providing the apparatus function change service will be described. Since the requests from the users can be roughly classified into requests for function addition or expansion and requests for repair of the apparatus, the method will be described regarding these two different types of requests.

(a) Function addition or expansion

Herein, it is assumed that a user makes a request for upgrading the reproduction function of the DVD 9 (FIG. 1) from 3× to 10×.

Step S1: Functions of the apparatus are initially set in accordance with the demands of the user. The user purchases the apparatus which has desirable functions initially set.

It is assumed, for example, that user A desires to purchase the DVD 9 having item number "DVD-#n1".

Table 1 shows the correspondence between the functions and the prices of "DVD-#n1". Table 1 also defines the correspondence between the functions and the setting of the reconfigurable chips for realizing the functions in "DVD-#n1". Table 1 is stored in a function table 1c in the apparatus service center 1.

The correspondence between the functions and the prices of "DVD-#n1" as shown in Table 1 is presented to user A before purchasing "DVD-#n1".

TABLE 1

| Function | Setting of reconfigurable chip | Price |
| --- | --- | --- |
| Function 1 (3X) | Reconfigurable chip A1: circuit block #1 (L) | X yen |
| Function 2 (10X) | Reconfigurable chip A1: circuit block #3 (H) | Y yen |

The price of the apparatus having function 1 (3×) is set to be lower than the price of the apparatus having function 2 (10×) (i.e., X yen<Y yen). The price of "DVD-#n1" depends on the function desired by user A.

When user A desires function 1 (3×), the reconfigurable chip A1 is initially set so that the circuit block #1 (L) is used in "DVD-#n1" (FIG. 1). When user A desires function 2 (10×), the reconfigurable chip A1 is initially set so that the circuit block #3 (H) is used. Such initial setting is done at a sales store of "DVD-#n1" or the apparatus service center 1. Function 1 (3×) can be preset as default for initial setting.

It is assumed that user A desires function 1 (3×) to be initially set in "DVD-#n1". The reconfigurable chip A1 of "DVD-#n1" is initially set so that the circuit block #1 (L) is used. The information on such initial setting is stored in an apparatus management information table 1a (FIG. 1) in the apparatus service center 1.

The following procedures will be described with an assumption that the circuit block in use in the reconfigurable chip A1 is changed from the circuit block #1 (L) to the circuit block #2 (L) after the purchase.

Customer Information indicating that user A has purchased "DVD-#n1" is stored in a customer list 1b (FIG. 1) in the apparatus service center 1. The apparatus management information table 1a and the customer list 1b are referred to when a function change is requested from the user.

Step S2: User A informs the apparatus service center 1 of a request for a function change of, for example, "upgrading the reproduction function of the DVD 9 from 3× to 10×". The request can be made through the network 4, a phone call or a facsimile call.

Step S3: Based on the request from user A, a change to be made in the reconfigurable chip of the apparatus is specified.

The item number of the apparatus used by user A is specified from the customer list 1b stored in the apparatus service center 1.

Table 2 shows a part of the customer list 1b. By referring to Table 2, the item number of the DVD 9 used by user A is specified as "DVD-#n1".

TABLE 2

| Customer | Item number |
| --- | --- |
| User A | DVD-#n1 |
|  | PC-#n2 |
|  | Refrigerator-#n3 |
|  | TV-#n4 |
| User B | DVD-#m1 |
|  | PC-#m2 |
|  | TV-#m3 |

By referring to Table 1, it is appreciated that the setting of the reconfigurable chip A1 of "DVD-#n1" needs to be changed in order to fulfill the request for "upgrading the reproduction function of the DVD 9 from 3× to 10×". Table 1 defines the correspondence between the functions and the setting of the reconfigurable chips in "DVD-#n1".

Table 3 shows a part of the apparatus management information table 1a (FIG. 1). Table 3 defines reconfigurable chips included in "DVD-#n1", circuit blocks included in each reconfigurable chip, and usage history information of each circuit block.

TABLE 3

| Reconfigurable chip | Configuration and usage history information of circuit block | | |
| --- | --- | --- | --- |
| Reconfigurable chip A1 | Block #1 (L) Used | Block #2 (L) In use | Block #3 (H) Unused |
| Reconfigurable chip B1 | Block #1 (L) In use | Block #2 (M) Unused | Block #3 (H) Unused |

By referring to Table 3, it is appreciated that the circuit block in use needs to be changed from the circuit block #2 (L) to the circuit block #3 (H) in order to fulfill the request from user A.

In this manner, the apparatus service center 1 specifies the change to be made in the reconfiguration chip of the DVD 9 by referring to the customer list 1b, the function table 1c, and the apparatus management information table 1a.

Step S4: Based on the specified change to be made in the reconfigurable chip, the change in the reconfigurable chip A1 is performed.

For example, when the reconfigurable chip A1 of "DVD-#n1" has the configuration shown in FIG. 2, the apparatus service center 1 sends 3-bit data (1,0,0) to the reconfigurable chip A1 via the network 4 (FIG. 1). The 3-bit data (1,0,0) is held in the shift register SR of the reconfigurable chip A1. Thus, the circuit block in use in the reconfigurable chip A1 is switched from the circuit block #2 (L) to the circuit block #3 (H).

After the change in the reconfigurable chip A1 is made, the usage history information in Table 3 is updated. Specifically, the usage history information of the circuit block #2 in the reconfigurable chip A1 is changed from "in use" to "unused", and the usage history information of the circuit block #3 in the reconfigurable chip A1 is changed from "unused" to "in use". The usage history information of the circuit block #2 in the reconfigurable chip A1 is changed to "unused" instead of "used", in order to allow the circuit block #2 to be reusable.

Step S5: User A is charged for the function change (i.e., upgrading in this case). The amount to be charged is determined based on the change of the circuit block in use from the circuit block #2 having the function level L to the circuit block #3 having the function level H.

As described above, a function change is realized by changing the setting of the reconfigurable chip according to the apparatus function changer service. Therefore, even after the apparatus such as the DVD is purchased addition or expansion of the functions is realized without purchasing additional hardware.

(b) Repair of the apparatus

Herein, it is assumed that a user makes a request for repairing the DVD 9 (FIG. 1).

Step S1: Functions of the apparatus are initially set in accordance with the demands of the user. The user purchases the apparatus which has desirable functions initially set.

It is assumed, for example, that user B desires to purchase the DVD 9 having item number "DVD-#m1". A table showing the correspondence between the functions and prices of "DVD-#m1" is presented to user B before purchasing "DVD-#m1". Herein, the correspondence is assumed to be identical with that shown in Table 1 for simplicity.

It is assumed that user B desires function 1 (3×) to be initially set in "DVD-#m1". The reconfigurable chip A1 of "DVD-#m1" is initially set so that the circuit block #1 (L) 4s used. The information on such initial setting is stored in the apparatus management information table 1a (FIG. 1) in the apparatus service center 1.

Customer information indicating that user B has purchased "DVD-#1m" is stored in the customer list 1b (FIG. 1) in the apparatus service center 1. The apparatus management information table 1a and the customer list 1b are referred to when a function change is requested from the user.

Step S2: User B informs the apparatus service center 1 of a request for "repairing the DVD 90". The request can be made through the network 4, a phone call or a facsimile call.

Step S3: Based on the request from user B, a change to be made in the reconfigurable chip of the apparatus is specified.

The Item number of the apparatus Used by user B is specified from the customer list 1b Stored in the apparatus service center 1.

By referring to Table 2, the item number of the DVD 9 used by user B is specified as "DVD-#m1".

Table 4 shows a part of the apparatus management information table 1a (FIG. 1). Table 4 defines reconfigurable chips included in "DVD-#m1", circuit blocks included in each reconfigurable chip, and usage history information of each circuit block.

TABLE 4

| Reconfigurable chip | Configuration and usage history information of circuit block | | |
|---|---|---|---|
| Reconfigurable chip A1 | Block #1 (L) In use | Block #2 (L) Unused | Block #3 (H) Unused |
| Reconfigurable chip A2 | Block #1 (L) In Use | Block #2 (L) Unused | Block #3 (H) Unused |

User confirms the symptom of the malfunction of the DVD 9. Based on the symptom, It is determined whether an internal LSI malfunctions in the DVD 9 or not. When it is determined that the internal LSI malfunctions, Table 4 is referred to. By referring to Table 4, it is appreciated that the circuit block in use in the reconfigurable chip A1 is the circuit block #1 (L) and that the circuit block in use in the reconfigurable chip A2 is the circuit block #1 (L).

The apparatus service center 1 tests the circuit blocks #1 (L) in use in a remote controlling manner through the network 4. Specifically, the apparatus service center 1 sends a desirable test pattern to the circuit blocks #1 (L) in use in the reconfigurable chips A1 and A2 and examines the test results. Thus, the apparatus service center 1 determines whether either of the circuit blocks #1 (L) in use malfunctions or not. In this manner, the circuit block which malfunctions is specified.

For example, it is assumed that the circuit block #1 (L) in the reconfigurable chip A2 is specified as malfunctioning. By referring to Table 4, it is appreciated that the circuit block in use needs to be changed from the circuit block #1 (L) to the circuit block #2 (L) in the reconfigurable chip A2, in order to fulfill the request from user B.

In this manner, the apparatus service center 1 specifies the change to be made in the reconfiguration chip of the DVD 9 by referring to the customer list 1b and the apparatus management information table 1a.

Step S4: Based on the specified change to be made in the reconfigurable chip, the change in the reconfigurable chip A2 is performed.

For example, when the reconfigurable chip A2 of "DVD-#m1" has the configuration shown in FIG. 2, the apparatus service center 1 sends 3-bit data (0,1,0) to the reconfigurable chip A2 via the network 4 (FIG. 1). The 3-bit data (0,1,0) is held in the shift register SR of the reconfigurable chip A2. Thus, the circuit block in use in the reconfigurable chip A2 is switched from the circuit block #1 (L) to the circuit block #2 (L).

After the change in the reconfigurable chip A2 is made, the usage history information in Table 2 is updated. Specifically, the usage history information of the circuit block #1 in the reconfigurable chip A2 to changed from "in use" to "used", and the usage history information of the circuit block #2 in the reconfigurable chip A2 is changed from "unused" to "in use". The usage history information of the circuit block #1 in the reconfigurable chip A2 is changed to "used" instead of "unused", in order to prevent the circuit block #1 from being reused.

Step S5: User B is charged for the function change (i.e., repair in this case). The amount to be charged is determined based on the change of the circuit block in use from the circuit block #1 having the function level L to the circuit block #2 having the function level L.

As described above, a function change is realized by changing the setting of the reconfigurable chip according to the apparatus function changer service. Therefore, even if the apparatus such as the DVD malfunctions, the apparatus can be repaired without physical chip replacement.

As described so far, the apparatus function change service system according to the present invention allows the users to select necessary functions when purchasing an apparatus and thus to reduce the initial cost. Since the apparatus includes a reconfigurable chip, function addition or expansion can be realized or the apparatus can be repaired by simply changing the configuration of the reconfigurable chip without providing additional hardware. Such a system substantially extends the life of hardware such as reconfigurable chips and thus reduces the ratio of disposal of chips or chip-mounting boards, as compared with the conventional business format. Such a business format according to the present invention is novel and environmentally responsible.

Use of the network for reconfiguration of the reconfigurable chips allows the apparatus function change service to be provided to the user of the apparatus satisfactorily quickly.

The apparatus function change service system according to the present invention is advantageous to apparatus marketers in expanding the business opportunities through the function change service performed after the purchase.

The apparatus function change service system according to the present invention is also advantageous to chip manufactures in allowing them to manufacture fewer types of chips on a larger scale, thereby providing scale efficiency. The additional value of the chips is increased; and the chips, which acquire remarkably extended life, are desirable from the environmental point of view.

As the reconfigurable chip, various types of chips are usable in addition to the reconfigurable chip shown in FIG. 2.

FIGS. 4 through 7 show configurations of various reconfigurable chips.

Figure 4:
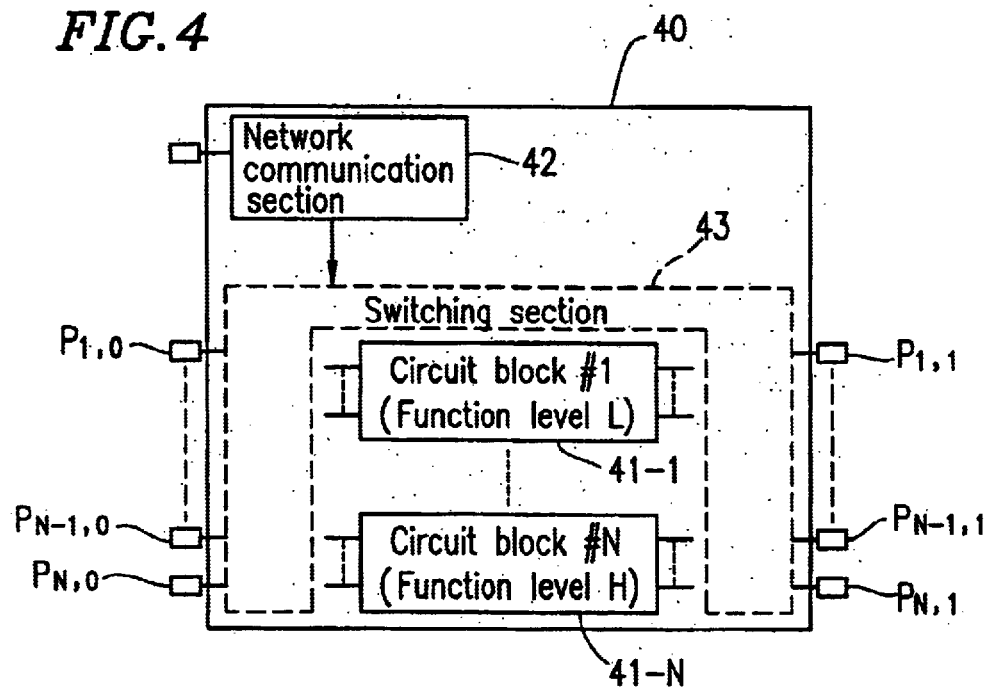
FIG. 4 is a block diagram illustrating a configuration of a reconfigurable chip mountable on the apparatus shown in FIG. 1.

FIG. 4 is a block diagram illustrating a configuration of a reconfigurable chip 40. The reconfigurable chip 40 is of the same type is the reconfigurable chip shown in FIG. 2.

The reconfigurable chip 40 includes N number of circuit blocks #1 (41-1) through #N (41-N), a network communication section 42 for receiving information for reconfiguring the reconfigurable chip 40, and a switching section 43 for switching the connection between the circuit blocks 41-1 through 41-N, external pins $P_{1,0}$ through $P_{k,0}$, and external pins $P_{1,1}$ through $P_{k,1}$ based on the information received by the network communication section 42.

The circuit blocks 41-1 through 41-N include a plurality of circuit blocks having an identical function level and a circuit block having a function level higher than that of the plurality of circuit blocks. At least one of the plurality of circuit blocks having the identical function level is replaceable with another of the circuit blocks having the identical function level. Accordingly, at least one of the plurality of circuit blocks having the identical function level is usable as a spare circuit block. The circuit block having the higher function level is usable for upgrading.

Figure 5:
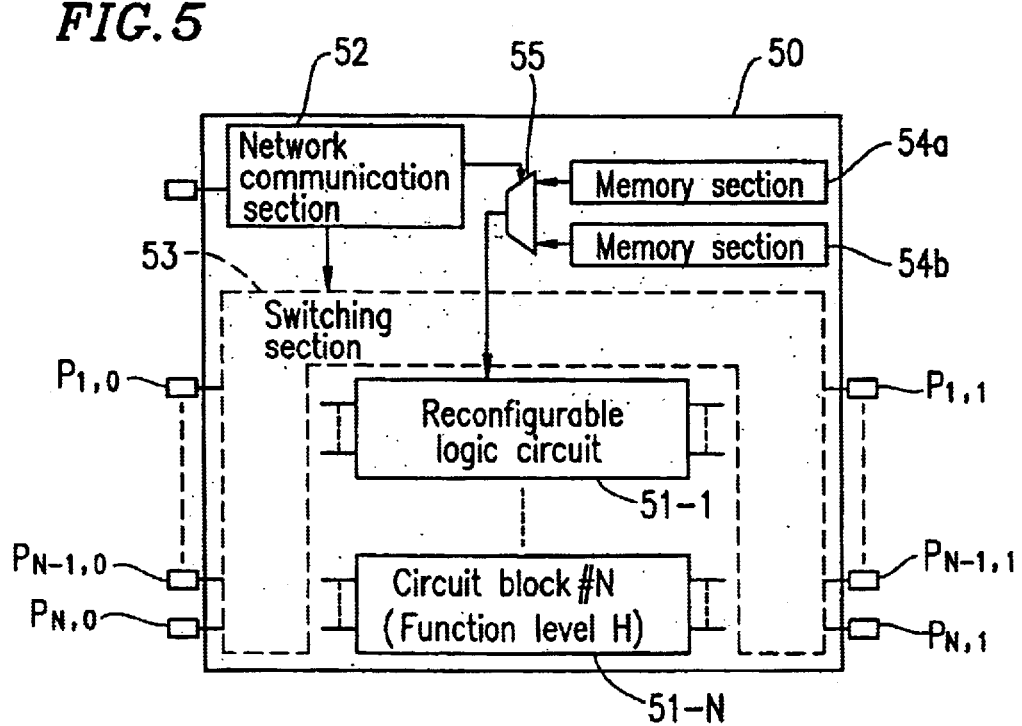
FIG. 5 is a block diagram illustrating a configuration of another reconfigurable chip mountable on the apparatus shown in FIG. 1.

FIG. 5 is a block diagram illustrating a configuration of a reconfigurable chip 50. The reconfigurable chip 50 includes a reconfigurable logic circuit 51-1 such as, for example, an FPGA (Field Programmable Gate Array) in place of the circuit block 41-1 shown in FIG. 4.

The reconfigurable chip 50 includes the reconfigurable logic 51-1; (N-1) number of circuit blocks #2 (51-2; not shown) through #N (51-N); a network communication section 52 for receiving information for reconfiguring the reconfigurable chip 50; a switching section 53 for switching the connection of the reconfigurable logic 51-1 and the circuit blocks 51-2 through 51-N with external pins $P_{1,0}$ through $P_{k,0}$ and $P_{1,1}$ through $P_{k,1}$ based on the information received by the network communication section 52; a memory section 54a for storing circuit connection information a; a memory section 54b for storing circuit connection information b; and a selector 55 for selectively supplying one of the circuit connection information a stored in the memory section 54a or the circuit connection information b stored in the memory section 54b to the reconfigurable logic circuit 51-1 based on the information received by the network communication section 52.

The reconfigurable logic circuit block 51-1 realizes a prescribed function in accordance with the circuit connection information given thereto. The reconfigurable logic circuit 51-1 is initially set to a function level L for, for example, realizing 3× reproduction of the DVD 9 (FIG. 1). It is assumed that the reconfigurable logic circuit 51-1 is initially used in the reconfigurable chip 50. The reconfigurable chip 50 includes a spare circuit block having the function level L. When the reconfigurable logic circuit 51-1 malfunctions, the reconfigurable logic circuit 51-1 is switched into the spare circuit block having the function level L. Such switching is performed by the switching operation by the switching section 53.

The circuit connection information a stored in the memory section 54a realizes, for example, 4× reproduction of the DVD 9. The circuit connection information b stored in the memory section 54b realizes, for example, 8× reproduction of the DVD 9. When the circuit connection information a is provided to the reconfigurable logic circuit 51-1, the reconfigurable logic circuit 51-1 operates as a circuit block for realizing 4× reproduction of the DVD 9. When the circuit connection information b is provided to the reconfigurable logic circuit 51-1, the reconfigurable logic circuit 51-1 operates as a circuit block for realizing 8× reproduction of the DVD 9.

When the apparatus service center 1 (FIG. 1) receives a request for a function change from the user (e.g., request for realization of 8× reproduction), the apparatus service center 1 refers to the apparatus management information table 1a and the customer list 1b to control the network communication section 52 in a remote controlling manner so that the circuit connection information b for realizing 8× reproduction is supplied to the reconfigurable logic circuit 51-1.

In this manner, the apparatus service center 1 fulfills the request for a function change from the user. The upgrading of the functions of the reconfigurable chip 50 can be realized by supplying one of the circuit connection information a and the circuit connection information b to the reconfigurable logic circuit 51-1. In this case, the switching operation of the switching section 53 is unnecessary.

The reconfigurable chip 50 includes a spare circuit block as the reconfigurable chip 40 shown in FIG. 4.

Figure 6:
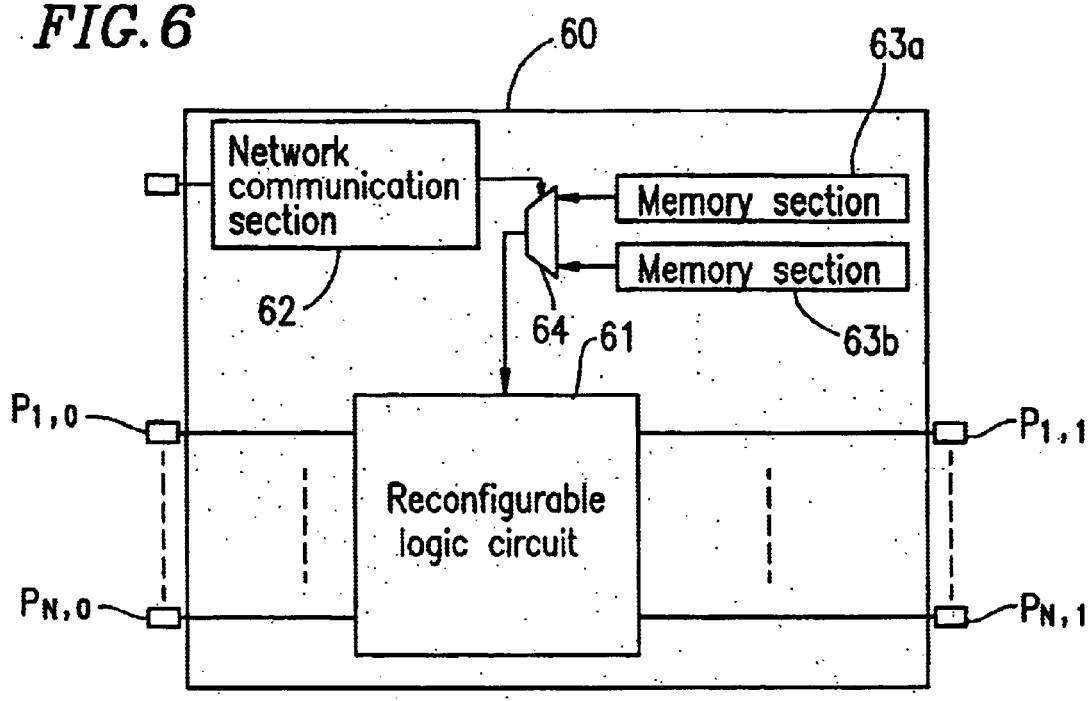
FIG. 6 is a block diagram illustrating a configuration of a still another reconfigurable chip mountable on the apparatus shown In FIG. 1.

FIG. 6 is a block diagram illustrating a configuration of a reconfigurable chip 60.

The reconfigurable chip 60 includes a reconfigurable logic circuit 61, a network communication section 62 for receiving information for reconfiguring the reconfigurable chip 60, a memory section 63a for storing circuit connection information a, a memory section 63b for storing circuit connection information b, and a selector 64 for selectively supplying one of the circuit connection information a stored in the memory section 63a or the circuit connection information b stored in the memory section 63b to the reconfigurable logic circuit 61 based on the information received by the network communication section 62.

The reconfigurable chip 60 does not Include a spare circuit block, unlike the reconfigurable chip 50 shown in FIG. 5.

Figure 7:
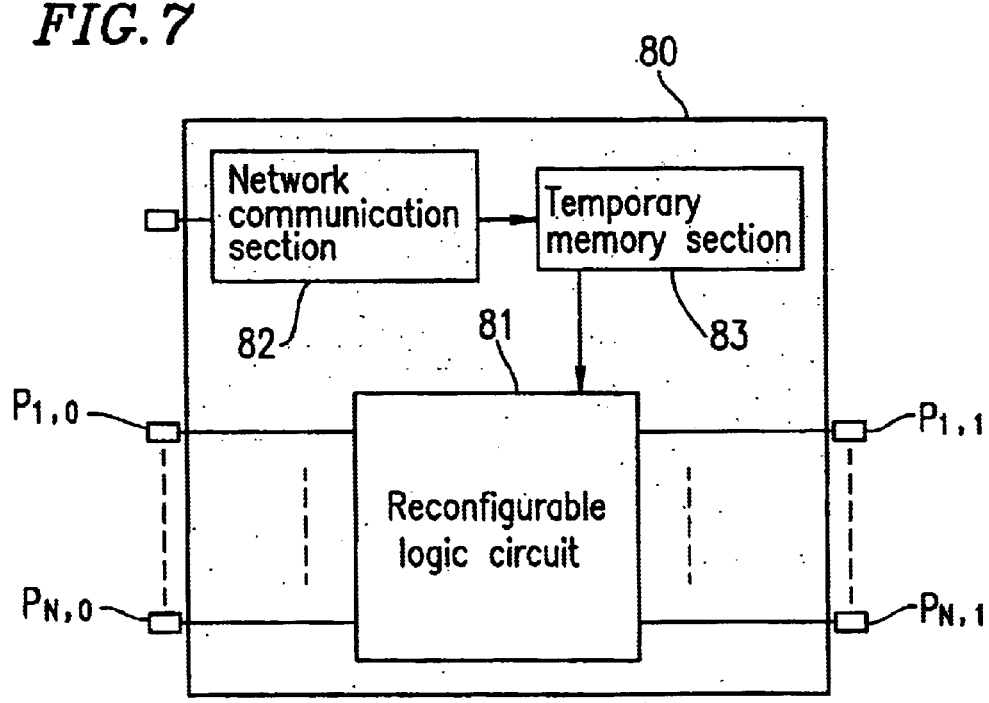
FIG. 7 Is a block diagram illustrating a configuration of a still another reconfigurable chip mountable on the apparatus shown in FIG. 1.

FIG. 7 is a block diagram illustrating a configuration of a reconfigurable chip 80.

The reconfigurable chip 80 includes a reconfigurable logic circuit 81, a network communication section 82 for receiving circuit connection information, and a temporary memory section 83 for temporarily storing the circuit connection information which is output from the network communication section 82. The circuit connection information temporarily stored in the temporary memory section 83 is supplied to the reconfigurable logic circuit 81.

In the reconfigurable chip 80 shown in FIG. 7, the circuit connection information for realizing a prescribed function of the reconfigurable logic circuit 81 is supplied from a device external to the reconfigurable chip 80.

The reconfigurable chip 80 does not include a spare circuit block, unlike the reconfigurable chip 50 shown in FIG. 5.

The reconfigurable chips 40, 50 and 60 shown in FIGS. 4 through 6 are effective in the case where apparatus functions which will be necessary in the future are predictable. The reconfigurable chip 80 shown in FIG. 7 is effective in the case where apparatus functions which will be necessary in the future are difficult to predict. Such unpredictability occurs in apparatuses, the specifications or formats of which have not been fixed (e.g., digital TV). Such apparatuses preferably include a reconfigurable chip of the type shown in FIG. 7.

The reconfigurable chips of the type shown in FIGS. 4 and 5 include a spare circuit block and thus have higher durability against malfunctions than the reconfigurable chips of the type shown in FIGS. 6 and 7.

The reconfigurable chips described above each include a function block for performing backup of the functions of the entire chip. Alternatively, a part of the functions of the chip can be changed.

In the above example, an increase in the speed of reproduction of a DVD is described as an example of the function expansion. It is also possible, for example, to mount a reconfigurable chip on an apparatus which can be reconfigured to provide any of a plurality of transfer speeds in conformity with IEEE1394, so that the apparatus service center changes the configuration of the chip in order to fulfill a demand of the user. Furthermore, the present invention is applicable to change functions of any other information household appliance.

According to the present invention, a request for a function change of the apparatus is fulfilled by simply reconfiguring a reconfigurable chip without requiring additional hardware. This substantially extends the life of hardware such as reconfigurable chips and thus reduces the percentage of disposal of chips or chip-mounting boards, as compared with the conventional business format. Such a business format according to the present invention is novel and environmentally responsible.

The request from the user can be repair of the apparatus, or function addition or expansion of the apparatus.

According to the present invention, a change in the reconfigurable chip is carried out via a network. This allows the apparatus function change service to be provided to the user of the apparatus satisfactorily quickly.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus function change service system, comprising:
   an apparatus including a reconfigurable chip and an apparatus service center for changing a function of the apparatus, the apparatus service center being connected to the apparatus via a network, wherein the apparatus service center includes:
   a request receiving section for receiving a request for a function change of the apparatus from a user;
   a specifying section for specifying a change to be made in a hardware configuration of the reconfigurable chip based on the request; and
   a sending section for sending information to the apparatus via the network to perform the change in the hardware configuration of the reconfigurable chip based on configuration of the reconfigurable chip,
   wherein the apparatus service center further includes:
   a customer list having customer information stored therein which indicates that the user has purchased the apparatus;
   a function table representing a relationship between the function of the apparatus and setting of the reconfigurable chip for realizing the function; and
   an apparatus management information table having setting information of the reconfigurable chip stored therein.

2. An apparatus function change service system according to claim 1, wherein the request is for repair of the apparatus.

3. An apparatus function change service system according to claim 1, wherein the request is for one of function in addition of the apparatus and function expansion of the apparatus.

4. An apparatus function change service system according to claim 1, wherein the reconfigurable chip includes a plurality of circuit blocks for realizing different functions from one another.

5. An apparatus function change service system according to claim 4, wherein the reconfigurable chip further includes a plurality of circuits for realizing an identical function.

6. An apparatus function charge service system according to claim 1, wherein the reconfigurable chip includes a reconfigurable logic circuit for realizing a prescribed function in accordance with circuit information.

7. An apparatus function change service method, comprising the steps of:
   selling an apparatus in which a reconfigurable chip is initially set so as to realize a function desired by a user;
   receiving, at an apparatus service center, a request for a function change of the apparatus from the user;
   specifying, at the apparatus service center, a change to be made in a hardware configuration of the reconfigurable chip based on the request; and
   sending information to the apparatus via a network to perform the change in the hardware configuration of the initially set reconfigurable chip based on the specified change to be made in the hardware configuration of the reconfigurable chip,
   wherein the step of selling the apparatus includes the steps of:
   storing, in a customer list in the apparatus service center, customer information which indicates that the user has purchased the apparatus; and
   storing, in the apparatus service center, initial setting information of the reconfigurable chip.

8. An apparatus function change service method according to claim 7, wherein the step of specifying the change to be made in the reconfigurable chip includes the step of:
   specifying, at the apparatus service center, the change to be made in the reconfigurable chip, referring to the customer list, the apparatus management information table, and a function table representing a relationship between a function of the apparatus and setting of the reconfigurable chip for realizing the function.

9. An apparatus function change service method according to claim 7, wherein after the step of sending the information to perform the change in the reconfigurable chip the method further includes the step of:
   updating the initial setting information in the apparatus management information table after the change in the reconfigurable chip is performed.

10. An apparatus function change service method according to claim 7, further comprising the step of charging the user for the function change of the apparatus.

11. An apparatus function change service method comprising the steps of:
   selling an apparatus containing a reconfigurable chip is initially set so as to realize a function desired by a user;
   receiving, at an apparatus service center, a request for a function change of the apparatus from the user;
   specifying, at the apparatus service center, a change to be made in a hardware configuration of the reconfigurable chip based on the request; and
   sending information to the apparatus via a network to perform the change in the hardware configuration of the initially set reconfigurable chip based on the specified change to be made in the hardware configuration of the reconfigurable chip, wherein the step of selling the apparatus includes the steps of:
offering a first set of initial settings so as to realize a function desired by a user;
offering a second set of initial settings so as to realize a second function desired by a user;
selecting between said first set of initial settings and said second set of initial settings;
charging X amount for the selection of said first set of initial settings;
charging Y amount for the selection of said second set of initial settings, wherein X than Y;
storing, in a customer list in the apparatus service center, customer information indicates that the user has purchased the apparatus;
storing, in the apparatus service center, initial setting information of the reconfigurable chip.

12. An apparatus function change service method, comprising the steps of:
selling an apparatus in which a reconfigurable chip is initially set so as to realize a default function;
receiving, at an apparatus service center, a request for a function change of the apparatus from the user;
specifying, the apparatus service center, a change to be made in a hardware configuration of the reconfigurable chip based on the request; and
sending information to the apparatus via a network to perform the change in the hardware configuration of the initially set reconfigurable chip based on the specified change to be made in the hardware configuration of the reconfigurable chip,
wherein the step of selling the apparatus includes the steps of:
storing, in a customer list in the apparatus service center, customer information which indicates that the user has purchased the apparatus; and
storing, in the apparatus service center, initial setting information of the reconfigurable chip.

* * * * *